March 7, 1967 M. L. E. CHWALOW 3,307,806
MISSILE GUIDANCE BY FREQUENCY MODULATED CONTROL SIGNALS
Filed Oct. 21, 1963 2 Sheets-Sheet 1
Fig. 1
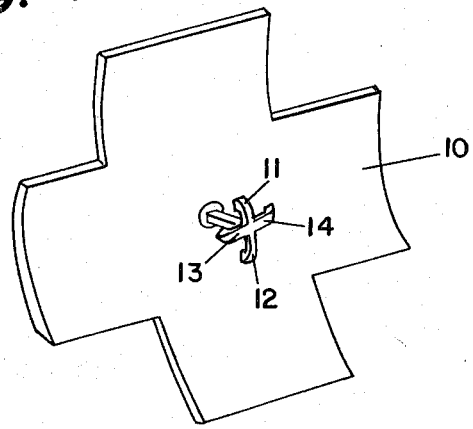
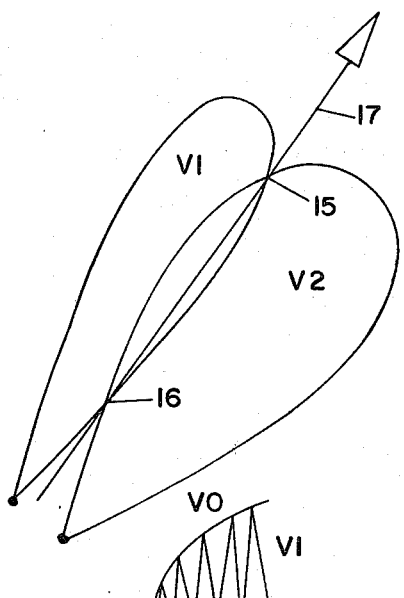
Fig. 2
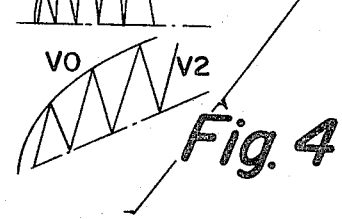
Fig. 4
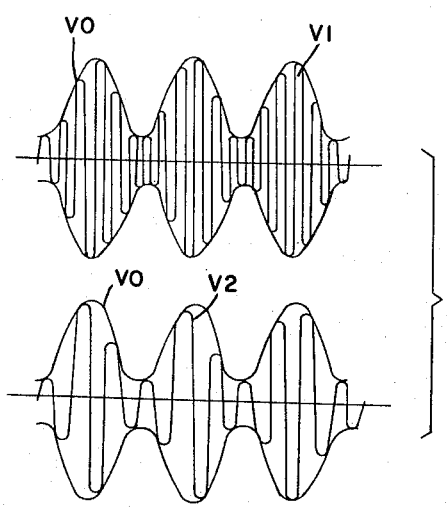
Fig. 3
INVENTOR.
MORTON L. E. CHWALOW
BY Harry M. Saragovitz,
Edward J. Kelly,
Herbert Berl &
S. Pubroff
ATTORNEYS.

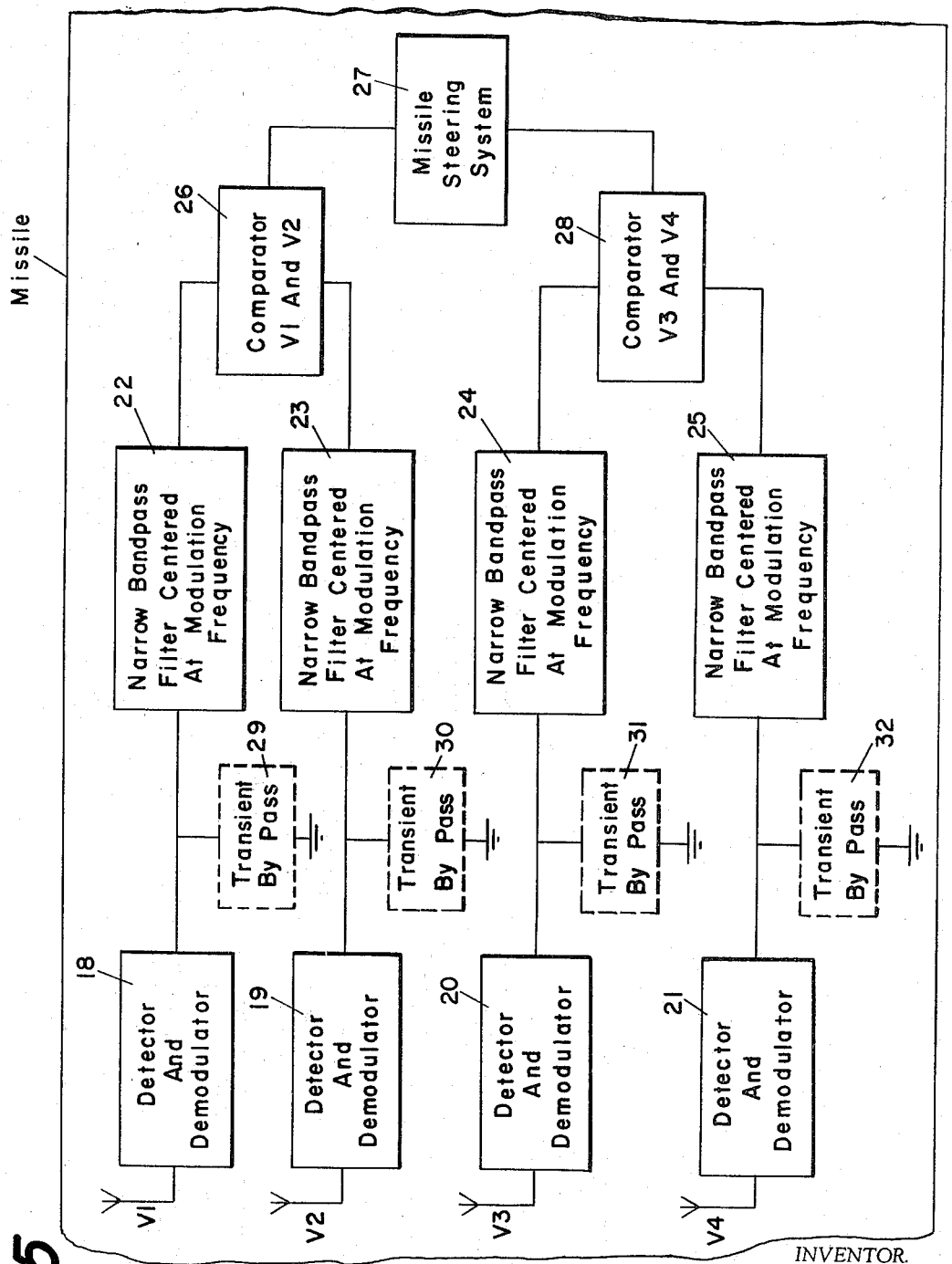

United States Patent Office 3,307,806
Patented Mar. 7, 1967

3,307,806
MISSILE GUIDANCE BY FREQUENCY MODU-
LATED CONTROL SIGNALS
Morton L. E. Chwalow, Philadelphia, Pa., assignor to
the United States of America as represented by the
Secretary of the Army
Filed Oct. 21, 1963, Ser. No. 317,849
3 Claims. (Cl. 244—3.14)

The invention described herein may be manufactured and used by or for the Government for governmental purposes without the payment to me of any royalty thereon.

This invention relates to beam-riding guided missile systems. It provides a unique beam and receiver system whereby the missile can obtain information for guiding it onto a chosen target with minimal interference from clutter signals. The nature of the system is such that it permits operation in cluttered atmospheres with wider beams and is therefore particularly applicable in the microwave region of the electromagnetic spectrum. Microwave radiation can be used conveniently with smaller antennas to minimize the problems of providing effective power and all weather performance.

For guidance along a line in a single plane, the beam comprises crossed lobes of two carrier wave signals at different frequencies V1 and V2. For guidance along a line common to two perpendicular planes, the beam comprises the lobes of four carrier wave signals of different frequencies V1, V2, V3 and V4, the V3 and V4 frequency lobes or signals being in a plane perpendicular to that occupied by V1 and V2 frequency lobes or signals. The V1, V2, V3 and V4 frequency signals are modulated at a very low frequency V0 and are transmitted in phase.

Two pairs of receivers are located in the missile. One pair receives the V1 and V2 frequency signals and provides control signal output for guiding the missile in one of the two perpendicular planes. The other pair receives the V3 and V4 frequency signals and provides control signal output for guiding the missile in the other of these planes. The missile is launched along a cross line common to the V1, V2, V3 and V4 frequency lobes and is thereafter maintained on this course by the control signal outputs of the receivers.

The invention will be better understood from the following description when considered in connection with the accompanying drawings and its scope is indicated by the appended claims.

Referring to the drawings:

FIG. 1 illustrates a type of antenna suitable for transmitting the missile guiding beam, FIGS. 2, 3 and 4 are explanatory diagrams relating to the characteristics of the different signals involved in the operation of the system, and FIG. 5 is a block circuit diagram relating to the receivers.

FIG. 1 illustrates a transmitting antenna which includes a reflector 10 and four wave-guide outlets or feeders 11, 12, 13 and 14. Each of these feeders applies a signal of a different frequency to the reflector 10. For example, the feeder 11 may deliver a signal having a frequency V1, the feeder 12 may deliver a signal having a frequency V2, and so on. No means for generating these signals are shown for the reason that such means are well known to those skilled in the art.

FIG. 2 indicates the relation between the V1 and V2 frequency signals. These signals are oriented in the same plane. The signals V3 and V4 are oriented in a plane which is perpendicular to the plane occupied by signals V1 and V2. The lobes of signals V1 and V2 intersect at points 15 and 16. This is also true of the signals V3 and V4. Under these conditions, an arrowed line 17 may be drawn common to all the intersecting points of the signal lobes. The line 17 is hereinafter considered to indicate the direction in which the missile is launched.

FIG. 3 indicates the modulation characteristics of each pair of signals, such as V1 and V2 for example, as transmitted from the antenna and received aboard the missile.

The V1, V2, V3 and V4 frequency signals in the four lobes emanating from the antenna 10 of FIG. 1 are picked up by antenna means for each of the respective signals and processed in the missile as indicated in FIG. 5. In each case, the signals from the respective antenna means are detected and demodulated by a detector and demodulator 18, 19, 20 or 21 after which they are passed through a narrow bandpass filter 22, 23, 24 or 25 which is centered at the modulation frequency. Spurious clutter signals as indicated in FIG. 4 will be of short time duration in comparison with the modulation period and if received will not pass through the above-mentioned narrow bandpass filter. The amplitudes of the V1 and V2 frequency signals are compared in a comparator 26 and the difference, if any, is utilized by the missile control system 27 to steer the missile back onto its desired course in one of the two perpendicular planes previously discussed. Likewise, the amplitudes of the V3 and V4 frequency signals are compared in a comparator 28 and any resulting difference is utilized by the missile control system 27 to steer the missile back onto its desired course in the other of the two perpendicular planes. This receiving system is capable of minimizing the effect of spurious signals due to clutter for the reason that such spurious signals appear as transients in the demodulated wave and are readily filtered by the filters 22, 23, 24, 25 and/or bypassed by the bypass means 29, 30, 31 or 32.

In the operation of the system, the missile is launched in the direction indicated by the line 17 of FIG. 2. Since this line is common to the intersecting points 15 and 16 of the V1 and V2 frequency lobes and also common to the same intersecting points for the V3 and V4 frequency lobes, it follows that no error signal is received so long as the missile remains in this line. When the missile veers from this line, however, an error signal is received. Thus if the missile veers to the right of the arrow as viewed in FIG. 2, the amplitude of the V2 frequency signal predominates and there results an error signal by which the missile is steered back onto its course. Similarly if the missile veers in the opposite direction, the amplitude of the V1 frequency signal predominates and there is produced an error signal by which the missile is steered back onto its course. The same procedure follows in connection with the V3 and V4 frequency signals with the exception that they effect steering in a plane which is perpendicular to that in which the V1 and V2 frequency signals function.

I claim:

1. An improved missile guidance system comprising, means responsive to two directional control signals for steering a missile, means for transmitting first and second frequency signals modulated by a relatively low frequency signal, the lobes of said first and second frequency signals being oriented in a single plane and overlapping to establish a first pair of intersecting points, means for transmitting third and fourth frequency signals modulated by said relatively low frequency signal, the lobes of said third and fourth frequency signals being oriented in a plane perpendicular to said single plane and overlapping to establish a second pair of intersecting points, said first and second pairs of intersecting points defining a desired straight line flight course for said missile, two pairs of signal receiving means adapted to be carried by said missile, the first of said pairs of receiving means having antenna means for picking up the first and second frequency signals and being tuned respectively to said first and second frequency signals and the second of said pairs of receiving means having antenna means for picking up the third and fourth frequency signals and being tuned respectively to said third and fourth frequency signals, a signal detector and demodulator means connected in each of said receiving means to derive the modulation signal as an output signal therefrom, means connected to receive and compare the modulation signal outputs of said first pair of receiving means thereby to derive a difference signal as one of said control signals for the steering means, whereby said missile is guided in said single plane, and mean connected to receive and compare the modulation signal outputs of said second pair of receiving means thereby to derive a difference signal as the other of said control signals for the steering means, whereby said missile is guided in said perpendicular plane, and means for minimizing the detrimental effect of clutter signals on the operation of said system, said means being connected in each of said receiving means following the detector and modulator means, thereby to prevent spurious clutter signals from being applied to said steering means, and the modulation period of said relatively low-frequency modulation signal being such that said spurious clutter signals are of relatively-short time duration as compared therewith.

2. A missile-guidance system as defined in claim 1, wherein the means for minimizing the detrimental effect of clutter signals include transient by-pass means followed by narrow bandpass filter means centered at the modulation frequency and connected between the detector and demodulator means and the comparing means.

3. An improved missile guidance system comprising in combination, missile steering means responsive to two control signals to maintain the missile on course in flight, means for transmitting first and second carrier-wave signals at different frequencies with two transmission lobes oriented in a first single plane and overlapping to establish a first pair of spaced points of intersection therein, means for transmitting third and fourth carrier-wave signals at different frequencies other than said first and second carrier-wave signal frequencies with two transmission lobes oriented in a second single plane at substantially a right angle to and intersecting the first plane with the said lobes overlapping to establish a second pair of spaced points of intersection in said second plane, said first and second pairs of intersection points being aligned to define a straight line on which a carrier missile for said system is to move on course, said carrier waves all being modulated at the same relatively-low frequency providing a modulation period such that spurious received clutter signals tending to adversely affect the steering means in operation are of relatively-short time duration with respect thereto, two pairs of signal receiving means adapted to be carried by said missile, the first of said pairs of receiving means having antenna elements for picking up the first and second carrier-wave signals and being tuned to the respective different signal frequencies thereof, and the second of said pairs of receiving means having antenna elements for picking up the third and fourth carrier-wave signals and being tuned to the respective different signal frequencies thereof, thereby to attain selective tuning and response to the four like-modulated carrier-wave signals at different frequencies, signal detector and demodulator means connected in each of said receiving means to derive the modulation signal as an output signal therefrom for control purposes, first comparator means connected to receive and compare the modulation signal outputs of said first pair of receiving means, thereby to derive a difference signal as one of said control signals for the missile steering means, second comparator means connected to receive and compare the modulation signal outputs of said second pair of receiving means, thereby to derive a second difference signal as the other of said two control signals for said missile steering means, means providing output connections from said first and second comparator means to said missile steering means for applying said control signals thereto, whereby the missile is guided on course in the first and second planes, and a narrow band-pass filter and transient by pass means included in circuit between each detector and demodulator means and the respective comparator means, thereby to prevent said spurious clutter signals from being applied to said steering means.

References Cited by the Examiner
UNITED STATES PATENTS

| | | | |
|---|---|---|---|
| 2,268,107 | 12/1941 | Bond | 343—108 X |
| 2,536,112 | 1/1951 | Varian et al. | 343—108 |
| 2,645,771 | 7/1953 | Labin. | |
| 2,682,051 | 6/1954 | Fisher | 343—108 |

BENJAMIN A. BORCHELT, *Primary Examiner.*

M. F. HUBLER, *Assistant Examiner.*